United States Patent
Lin

(10) Patent No.: US 8,284,052 B2
(45) Date of Patent: Oct. 9, 2012

(54) MESSAGING ENGINE HEALTH CHECK

(75) Inventor: Zhijian Lin, Dublin, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 785 days.

(21) Appl. No.: 12/483,553

(22) Filed: Jun. 12, 2009

(65) Prior Publication Data

US 2010/0315240 A1 Dec. 16, 2010

(51) Int. Cl.
*G08B 21/00* (2006.01)
*G08B 1/08* (2006.01)
*G08B 9/00* (2006.01)
*G08B 5/22* (2006.01)
*G06F 15/173* (2006.01)

(52) U.S. Cl. ..... 340/540; 340/539.1; 340/6.1; 340/7.58; 340/286.02; 709/224

(58) Field of Classification Search ................ None
See application file for complete search history.

(56) References Cited

U.S. PATENT DOCUMENTS

| | | | |
|---|---|---|---|
| 6,049,698 A * | 4/2000 | Capers et al. | 340/7.1 |
| 6,987,847 B1 * | 1/2006 | Murphy et al. | 379/201.1 |
| 7,895,256 B2 * | 2/2011 | Zombek et al. | 709/200 |
| 2009/0099864 A1 * | 4/2009 | Cronrath et al. | 705/2 |
| 2010/0279647 A1 * | 11/2010 | Jacobs et al. | 455/404.1 |

* cited by examiner

*Primary Examiner* — Julie Lieu

(57) ABSTRACT

A method comprises submitting a content message to an alerting engine from a health monitor, said content message being configured to cause said alerting engine to send an alert message to a communications device. The method may further comprise determining, using said health monitor, an expected alert message according to said submitted content; receiving, at said health monitor, an alert message forwarded from said communications device; comparing said received alert message with said expected alert message; and selectively sending an alarm message based on said determination.

26 Claims, 2 Drawing Sheets

MESSAGING ENGINE HEALTH CHECK

BACKGROUND

A messaging system may be configured to send messages to many subscribers. For example, a messaging system may send Short Message Service (SMS) and Multimedia Messaging Service (MMS) messages to a plurality of subscriber devices. Such a system may have multiple subsystems, components, and integration points. Accordingly, it may be crucial to check the health of the messaging system to assure successful message delivery.

DETAILED DESCRIPTION

Figure 1:
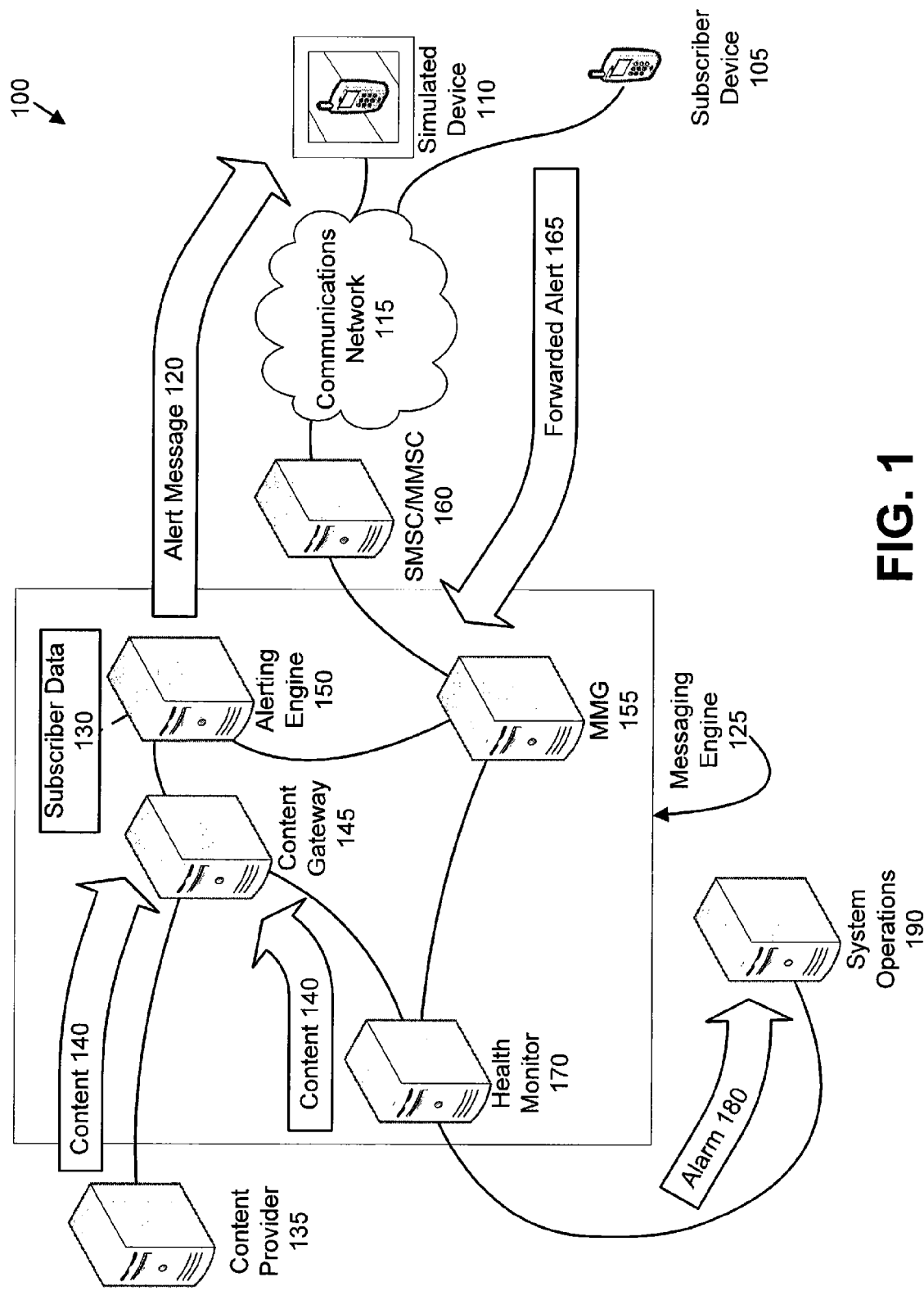
FIG. 1 illustrates an exemplary communications system.

FIG. 1 illustrates an exemplary communications system 100 for the creation and monitoring of alert messages as well for as the detection of health problems on the network. While an exemplary system 100 is shown in FIG. 1, the exemplary components illustrated in the figure are not intended to be limiting. Indeed, additional or alternative components and/or implementations may be used.

The system 100 may provide messages to subscribers through a data path involving many systems and components. If one, some, or all of the systems or components along the data path fail, the system may not be able to send messages to the subscribers. Therefore, it may be important to monitor the health of the systems to assure successful message delivery and connectivity along the data path. If a problem or potential problem is found during monitoring, it may be important to inform system operations.

The system 100 may comprise a health monitor 170 and a simulated subscriber device 110. A message loop may be created from the health monitor 170, to the simulated subscriber device 110, and back to the health monitor 170. Accordingly, through use of the message loop, the system 100 may assure the health of systems and components as well as connectivity along a data path.

As illustrated in FIG. 1, in an exemplary approach system 100 includes a subscriber device 105 and a simulated device 110. A subscriber device 105 or other communications device (including, but not limited to Plain Old Telephone Service (POTS) telephone, Voice Over Internet Protocol (VOIP) telephone, mobile telephone, "softphone," pager, computer, Set Top Box (STB), etc.) is used by a subscriber to send and receive communications (such as voice, text, image, video, binary data, etc.) on a communications network 115. Communications network 115 may include one or more interconnected networks (e.g., Public Switched Telephone Network (PSTN), VOIP, cellular telephone, etc.), that provide communications services, including voice calling, packet-switched network services (including, for example, Internet access and/or VOIP communication services), as well as Short Message Service (SMS) messaging and Multimedia Messaging Service (MMS) messaging services, to at least one subscriber device 105.

A simulated device 110 is a device or system that may emulate the functionality of at least a portion of another device, e.g., device 105, so as to appear and behave like the other device. A simulated device 110 may be particularly useful for system testing, as the simulated device 110 may be deployed on existing hardware without requiring the purchase of new specialized hardware. Moreover, a simulated device 110 may be easier to maintain than a non-simulated device, which may be unwieldy or may require physical maintenance such as periodic battery recharge.

Accordingly, a simulated device 110 may be used to emulate one or more subscriber devices 105. In some examples, a simulated device 110 may be implemented through use of a cellular telephone emulator software program executed by a computing device (not shown in FIG. 1). The simulated device 110 may be connected to the communications network 115 at a particular network or physical location, and may be capable of roaming throughout the communications network 115 to facilitate testing of different portions of the communications network 115. The simulated device 110 may emulate specific functions of a subscriber device 105, including the sending and receiving of SMS/MMS messages from a communications network 115 that supports SMS/MMS.

Because a simulated device 110 may not necessarily be monitored by a regular subscriber, a simulated device 110 may be further configured to forward received messages to another device in the system 100 for analysis. The other device on the network may be indicated by a particular network address (e.g., telephone number, short code, Internet Protocol address, etc.), and the simulated device 110 may forward any messages received by the simulated device 110 to the other device by sending the received messages to the particular network address. In some examples, the simulated device 110 may be configured to forward all received SMS/MMS messages to a particular short code, where the short code identifies a device or devices on the network configured to receive the forwarded messages.

SMS is a messaging protocol that typically is used for the sending and receiving of SMS messages to and from devices, including, for example, subscriber device 105 and simulated device 110. SMS messages may also be sent and received by other devices, including wired devices such as an External Short Message Entity (ESME) and a desktop computer. An SMS message typically may contain up to 120 7-bit characters (or fewer characters in a larger bit encoding), and may include textual and binary data. Longer messages may be sent by concatenating multiple SMS messages.

MMS is a service that may allow a subscriber to send multimedia files (e.g., pictures, movies, slideshows, and other graphical materials) in combination with textual data from one device to another (e.g., subscriber device 105, simulated device 110, content provider 135, etc.). A subscriber device 105 configured to receive MMS messages through Wireless Application Protocol (WAP) may receive a notification that an MMS message is available, retrieve the message, and display the message to a subscriber. A subscriber device 105 that is not configured to receive MMS messages through WAP may receive an SMS message notification that an MMS message has arrived, and that the MMS message may be available to be retrieved through another mechanism than WAP, such as via HTTP or e-mail. MMS messages may further be sent to e-mail addresses directly, instead of or in addition to being sent to a subscriber device 105.

MMS content may include files of various types, including but not limited to text files, image files, audio files, and video files. For example, pictures, ring tones, video clips, and textual news stories may all be sent via MMS messaging. MMS content may further include presentation data (i.e. Synchronized Multimedia Integration Language (SMIL), Extensible Hyper Text Markup Language (XHTML), etc.) to allow for multimedia files to be put together or otherwise arranged into presentations.

An alert message 120 is a message that may be sent to a subscriber device 105 or a simulated device 110 to provide the device with alert information. A messaging engine 125 may send alert messages 120 to subscriber devices 105 and simulated devices 110 according to subscription data 130, where the subscription data 130 may include information regarding what alert messages 120 the devices are subscribed to receive. An alert message 120 may include various types of content, including textual content and multimedia content. An alert message may be an SMS message, an MMS message, or another type of message including but not limited to a Signaling System 7 message, an e-mail, an instant message from an instant message service such as America Online Instant Messaging Service, a voice message synthesized by an auto-attendant, etc.

The subscription data 130 for a subscriber may include information relating to the content of alert messages 120 to be sent to the subscriber device 105, as well as a trigger condition upon which the alert message 120 is to be sent. For example, subscription data 130 may indicate for an alert message 120 to include content from a particular content channel, including, but not limited to an Entertainment channel, a News channel, a Sports channel, a Travel & Weather channel, etc. A trigger condition for alert message 120 delivery may include a scheduled time at which to send the alert message 120 (e.g. a selected day or days of the week, a specified time or times of the day, on a birthday, an anniversary, a holiday, etc.), inclusion of a particular keyword in a news item (e.g. news stories including mention of a chosen celebrity), a trigger based on a real-time event (e.g. receiving a sports score when additional points are earned, at the conclusion of a period of a sports game, game quarter, game, etc.), or trigger based on a defined event (e.g., on a stock ticker symbol and the movement of the chosen stock into or out of a chosen stock price range).

A content provider 135 may provide content messages 140 to the messaging engine 125 to provide the underlying content for the messaging engine 125 to use to create the alert messages 120. System 100 may include one or more content providers 135, although only one is shown in the figure for simplicity, and may include different content providers 135 for different categories and channels of content. As an example, the system 100 may include a content provider 135 for Entertainment channel content, another for News channel content, another for Sports channel content, and yet another for Travel & Weather channel content. The system 100 may include multiple content providers 135 for a single channel as well, such as multiple content providers 135 for Entertainment channel content.

A content message 140 may include at least one content file, wherein each content file may include an item of information that may be included in an alert message 120. For example, a content file may include a news story on a celebrity, a sports score for a game, a picture of a famous athlete, a picture of a radar chart to include in a weather forecast, a textual weather forecast, etc. A content file may additionally include information regarding how the other content files are to be presented. For example, a content file may include layout information (e.g. SMIL, XHTML, etc.) regarding how other content files in the content message 140 may be incorporated into an alert message 120. The content message 140 may include textual and multimedia content files in various formats and encoded in various ways, including binary, encapsulated and encoded as text such as Multipurpose Internet Mail Extensions (MIME), etc. Further, the content message 140 or content files may include metadata indicating the channel, data type, and content category of the included content files.

Returning to the messaging engine 125, a messaging engine 125 may comprise a content gateway 145, an alerting engine 150, a messaging gateway (MMG) 155, and a health monitor 170. The messaging engine 125 may create alert messages 120 based on received content messages 140, and may facilitate the sending of alert messages through communications network 115 to subscriber devices 105 and to simulated devices 110.

A content gateway 145 may receive content messages 140 from the content provider 135. The content gateway 145 may serve as an entry point for data to the messaging engine 125 and may forward the content to an alerting engine 150.

The alerting engine 150 may receive the content from the content gateway 145, extract the content files from the content message 140, and generate the alert messages 120. For example, the alerting engine 150 may compare the content extracted from the content message 140 with stored subscription data 130 indicating which alert messages 120 are to be sent to which subscriber devices 105. In some instances, content extracted from the content message 140 may include metadata to be matched with stored identifiers associated with subscriber devices 105, and if matching data is found, then the messaging engine 125 may generate an alert message 120 and send the message to the associated subscriber device 105.

The messaging engine 125 may further include a messaging gateway (MMG) 155. The MMG 155 may serve as a connection point between the messaging engine 125 and a Short Message Service Center (SMSC)/Multimedia Messaging Service Center (MMSC) 160 and the communications network 115. MMG 155 may receive alert messages 120 from the alerting engine 150, and forward the messages to an appropriate SMSC/MMSC 160. MMG 155 may also receive messages addressed to the messaging engine 125 via the SMSC/MMSC 160, and forward the messages to an appropriate component of the messaging engine 125 for processing.

An SMSC/MMSC 160 may be connected to communications network 115 and to the messaging engine 125, and perform various functions in relation to SMS/MMS messaging. For example, the SMSC/MMSC 160 may send an SMS message over the communications network 115 to a subscriber device 105. The SMSC/MMSC 160 may alternately send a control message (such as an alert message, an SMS message, etc.) to a subscriber device 105 indicating to the subscriber device 105 that an MMS message is available. The control message may include a Uniform Resource Locator (URL) specifying the location of extracted content, such as a location on the communications network 115. The subscriber device 105 may then use a Wireless Application Protocol (WAP) browser, HTML browser or other mechanism to retrieve the multimedia content from the specified location. Accordingly, SMSC/MMSC 160 may forward alert messages 120 from the MMG 155 to the subscriber device 105.

The SMSC/MMSC 160 typically may include store and forward functionality, in which for example, MMS messages including alert messages 120 that are sent to the SMSC/MMSC 160 may be sent immediately to a subscriber device 105 or may be kept (e.g., in a message store) and sent to the subscriber device 105 at a later time when the subscriber device 105 may be available. Moreover, an alert message 120 may be forwarded to an SMSC/MMSC 160 acting as a relay. The SMSC/MMSC 160 may forward the alert message 120 to another SMSC/MMSC 160 if, for example, the subscriber device 105 is on a different communications network 115 or otherwise should be served by a different SMSC/MMSC 160. Only one SMSC/MMSC 160 is shown in FIG. 1 for clarity.

Accordingly, through use of a system such as exemplary system 100, alert messages 120 may be sent to subscriber devices 105 including content received from a content provider 135. Moreover, in addition to the sending of alert messages 120, system 100 may further check the health of the messaging system to assure successful message delivery.

As illustrated in FIG. 1, the messaging engine 125 may further include a health monitor 170. The health monitor 170 may check the health of the alert message 120 delivery path by providing simulated content messages 140 to the alerting engine 150. In many examples, the health monitor 170 may provide simulated content messages 140 to the alerting engine 150 via the content gateway 145. The simulated content messages 140 may include content files designed for use in testing the system 100 and not for any other purpose. The simulated content files may be, for example, text files including a specific phrase (e.g., "this is a test message,"), data files including a repeating pattern of bytes (e.g., "0xFF, 0x00, 0xFF, 0x00"), and stock content files retained for testing (possibly originally from a content provider 135). Additionally, the simulated content files may be associated with testing metadata so as to identify the files to the alerting engine 150 as simulated content. For example, testing metadata may include a bit, flag, or other code associated with the content files. If the testing bit, flag, or code is set, then the metadata may indicate that the content file is a testing content file. If not, then the metadata may indicate that the content file is a live content file. Accordingly, simulated content files may be identified and used in the creation of test alert messages 120 for use in verifying the health of the system 100.

A simulated device 110 may be associated with subscription data 130 subscribing the simulated device 110 to an alert message 120 comprising content in a content channel. Subscription data 130 for a subscriber may include information relating to the content and trigger condition of alert messages 120 to be sent to a subscriber device 105. Similarly, subscription data 130 for a simulated device 110 may include information relating to the content channel and trigger condition of an alert message 120 to be sent to a simulated device 110 as a test. The subscription data 130 may further include a testing metadata bit, flag, or code indicating that the subscribed alert message 120 is to include content files associated with the testing metadata, and not live content from a content provider 135.

To ensure that subscriber devices 105 do not unintentionally receive test alert messages 120, a device identifier for the device to which a test alert message 120 is to be sent may be verified to ensure it is an identifier of a simulated device 110. If a device is determined to be a subscriber device 105 and not a simulated device 110, then the test alert message 120 may not be sent. This check may be performed to ensure that only simulated devices 110 are sent alert messages 120 including content intended as a test.

Accordingly, simulated device 110, but not subscriber devices 105, may receive test alert messages 120 from the messaging engine 125, where the test alert messages 120 include testing content files from simulated content messages 140.

Moreover, as indicated above, simulated device 110 may have an ability to forward received messages to another device indicated by a network address. For example, the simulated device 110 may be configured to automatically forward alert messages 120 back to the messaging engine 125 as a forwarded alert message 165. The simulated device 110 may receive test alert messages 120 and may forward them as forwarded alert messages 165 to a particular network address (e.g., telephone number, short code, Internet Protocol (IP) address, etc.). The particular network address may be an address known to the simulated device 110, or may be determined based the test alert message 120 received by the simulated device 110 (e.g., sender address). The SMSC/MMSC 160 may accordingly receive the forwarded alert message 165 and may send it to the MMG 155 of the messaging engine 125 indicated by the network address. The MMG 155 in turn may forward the forwarded alert message 165 to the health monitor 170.

Thus, the test alert message 120 may travel from the health monitor 170 to the simulated device 110 and back to the health monitor 170. Accordingly, a message loop may be created which may be used to assure the health of the systems and components, as well as the connectivity along the path.

To assure the health of the network, once the health monitor 170 receives the forwarded alert message 165, the health monitor 170 may then compare the forwarded alert message 165 with an expected alert message. Based on the determination the health monitor 170 may determine the health of the network. For example, if a content file expected to be included in the alert message 120 is missing, corrupted, or otherwise does not match, if a content file not expected to be included in the forwarded alert message 165 is included, or if the forwarded alert message 165 is not received within a predetermined amount of time, then the messaging engine 125 may alert system operations 190 of the existence of a network problem or potential problem. In some examples health monitor 170 may send an alarm 180 signal in the form of an e-mail message to system operations 190 including the details of the network problem.

The simulated device 110 may be connected to the network at different physical locations and network addresses. For example, a physical location may be the physical location of a particular router or switch that is a part of communications network 115, while a network address may be a telephone number, short code, IP address or some other assigned network identifier. The simulated device 110 may be capable of being moved from one location to another, and thus allow for testing of different physical locations and network addresses on the communications network 115.

Content files including different types, channels, and sizes of content may be included in the simulated content messages 140. Accordingly different types, channels, and sizes of content files may be tested through use of the health monitor 170.

In general, computing devices such as subscriber device 105, content provider 135, and SMSC/MMSC 160 may employ any of a number of well known computer operating systems, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Computing devices may include any one of a number of well known computing devices, including, without limitation, a computer workstation, a desktop, notebook, laptop, or handheld computer, or some other known computing device.

One or more of content gateway 145, alerting engine 150, MMG 155, health monitor 170 may be implemented as software running on at least one computing device. For example, alerting engine 150 and health monitor 170 may each be implemented in software running on a computing device. As another example, alerting engine 150 and health monitor 170 may alternately be standalone computing devices that each include a processor and memory, as well as a computer readable medium for storing data. In still other examples, each of content gateway 145, alerting engine 150, MMG 155, health monitor 170 may be implemented as a separate computing devices.

Computing devices generally each include instructions executable by one or more computing devices such as those listed above. Computer-executable instructions may be compiled or interpreted from computer programs created using a variety of well known programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium (also referred to as a processor-readable medium) includes any tangible medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners, as is known. A file system may be accessible from a computer operating system, and may include files stored in various formats. An RDBMS generally employs the known Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.).

Figure 2:
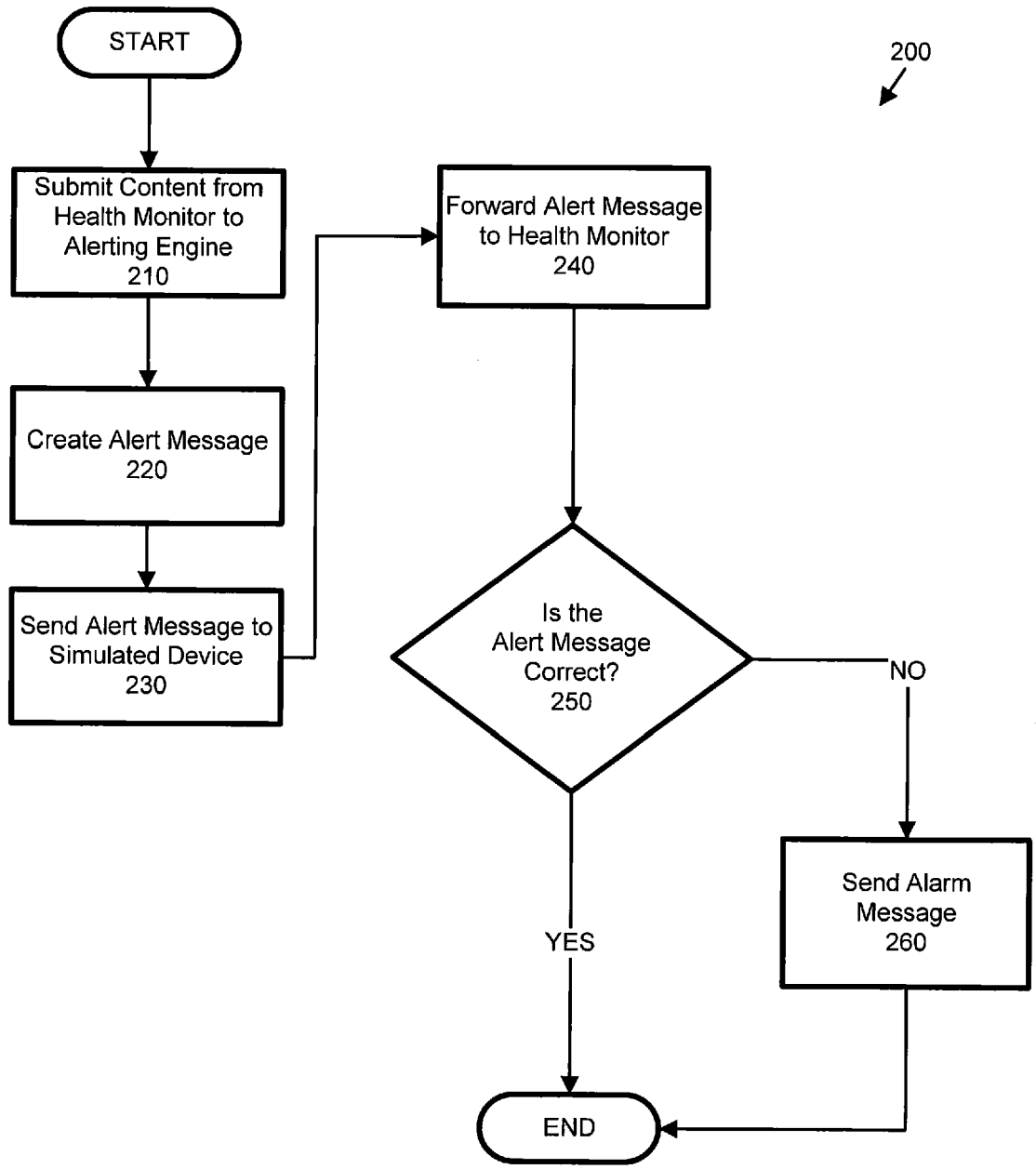
FIG. 2 illustrates an exemplary process flow for verification of the health of a messaging system.

FIG. 2 illustrates an exemplary process flow 200 for verification of the health of the messaging system 100.

In step 210, the health monitor 170 submits a simulated content message 140. For example, the health monitor 170 may submit the simulated content message 140 to the content gateway 145, and the content gateway 145 may process the content message 140 and forward the content message 140 to the alerting engine 150.

Next, in step 220, the alerting engine 150 processes the received content message 140 and create alert messages 120. For example, the alerting engine 150 may extract content files and associated metadata from the content message 140. The alerting engine 150 may match the metadata with identifiers in subscription data 130 associated with a simulated device 110, and if matching data is found, the alerting engine 150 may generate an alert message 120 to be sent to the simulated device 110.

Next, in step 230, the alert message 120 is sent to the simulated device 110. For example, the alerting engine 150 may send the alerting message to MMG 155, which may act as a gateway between the messaging engine 125 and the system.

Based on the location of the simulated device 110, the MMG 155 may send the alert message 120 to an appropriate SMSC/MMSC 160 for the simulated device 110. The SMSC/MMSC 160 may then forward the alert message 120 to the simulated device 110 over the communications network 115.

Next, in step 240, the simulated device 110 forwards the message back to the messaging engine 125. For example, the simulated device 110 may forward all received SMS/MMS messages received by the simulated device 110 to a particular short code identifying the messaging engine 125. The SMSC/MMSC 160 may receive the forwarded alert message 165 and may accordingly pass the forwarded alert message 165 to the MMG 155 of the messaging engine 125. The MMG 155 may then pass the forwarded alert message 165 back to the health monitor 170.

Next, in step 250, the health monitor 170 determines whether the forwarded alert message 165 includes the correct content. For example, if the forwarded alert message 165 includes a content file that exactly matches the content file sent to the simulated device 110, then the forwarded alert message 165 may be determined to be correct. If a content file is missing, corrupted, or otherwise does not match, if an unexpected content file is included, or if the forwarded alert message 165 is not received within a predetermined amount of time, then the forwarded alert message 165 is determined to be incorrect. If the forwarded alert message 165 is correct, process 200 ends. Otherwise, step 260 is executed next.

In step 260, an alarm 180 message is sent to system operations 190. For example, the health monitor 170 may send an e-mail message to the system operations 190 indicating that a problem occurred and with details of the problem.

Next, the process 200 ends.

Conclusion

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method, comprising:
    submitting a content message to an alerting engine from a health monitor, said content message being configured to cause said alerting engine to send an alert message to a communications device;
    determining, using said health monitor, an expected alert message according to said submitted content;
    receiving, at said health monitor, an alert message forwarded from said communications device; and
    comparing said received alert message with said expected alert message.

2. The method of claim 1, further comprising selectively sending an alarm message based on said comparison.

3. The method of claim 2, wherein said alarm message is submitted to a system operator if said received alert message and expected alert message do not match.

4. The method of claim 1, further comprising sending an alarm message if said received alert message is not received within a predetermined amount of time.

5. The method of claim 4, wherein said alarm message comprises an e-mail message addressed to a system operator.

6. The method of claim 1, wherein said submitted content message comprises a content file and associated metadata, said content message being further configured to cause said alerting engine to send said alert message to said communications device including said content file.

7. The method of claim 6, wherein said comparing said received alert message with said expected alert message comprises determining if said content file is included in said received alert message.

8. The method of claim 6, wherein said content file comprises data responsive to at least one of a content type to test, a content channel to test, and a file size to test.

9. The method of claim 1, wherein submitting a content message to an alerting engine further comprises:
    submitting said content message to a content gateway configured to receive content messages from at least one content provider; and
    said content gateway submitting said content message to said alerting engine.

10. The method of claim 1, wherein said communications device is a simulated device.

11. The method of claim 1, wherein said alert messages comprise at least one of a short message service message and a multimedia messaging service message.

12. A method, comprising:
    receiving a content message from a health monitor, said content message comprising a content file and associated metadata;
    identifying a communications device to which to send an alert message based on subscription data and said content message;
    sending said alert message to said communications device including said content file;
    receiving a forwarded alert message from said communications device, said forwarded message being in response to the sending of said alert message; and
    sending said forwarded alert message to said health monitor.

13. The method of claim 12, further comprising verifying that said communications device is a simulated device before sending said alert message to said communications device.

14. The method of claim 12, further comprising periodically resending said alert message to said communications device.

15. The method of claim 12, wherein said alert message is at least one of a short message service message and a multimedia messaging service message.

16. The method of claim 12, further comprising:
    receiving a second content message from a content provider, said second content message comprising a second content file and second associated metadata;
    determining a second communications device to which to send a second alert message based on said subscription data and said second content message; and
    sending said second alert message to said second communications device including said second content file.

17. A system, comprising:
    a messaging engine including at least one computing device; said messaging engine storing subscription data and configured to selectively send communications with at least one communications device; and
    a health monitor, said health monitor configured to:
        submit a content message to said messaging engine, said content message comprising a content file and associated metadata and being configured to cause said messaging engine to send an alert message including said content file to a communications device based on said subscription data and said content message;
        determine an expected alert message according to said submitted content;
        receive an alert message forwarded from the communications device; and
        compare said received alert message with said expected alert message.

18. The system of claim 17, wherein the system includes a plurality of communications devices, at least a subset of said communications devices being simulated devices.

19. The system of claim 17, wherein said health monitor is further configured to selectively send an alarm message based on said determination.

20. The system of claim 19, further comprising a systems operations device, said system operations device configured to receive alarm messages from said health monitor.

21. The system of claim 19, wherein said messaging engine is further configured to:
    receive said content message from said health monitor;
    determine a communications device in a plurality of communications devices to which to send an alert message;
    send said alert message including said content file to said communications device;
    receive a forwarded alert message from said communications device, said forwarded message being in response to said alert message including said content file; and
    send said forwarded alert message to said health monitor.

22. A system, comprising:
a messaging engine device including at least one computing device; said messaging engine configured to:
  receive a content message from a health monitor, said content message comprising a content file and associated metadata;
  identify a communications device to which to send an alert message based on subscription data and said content message;
  send said alert message to said communications device including said content file;
  receive a forwarded alert message from said communications device, said forwarded message being in response to the sending of said alert message; and
  send said forwarded alert message to said health monitor.

23. The system of claim 22, wherein said messaging engine is further configured to verify that said communications device is a simulated device before sending said alert message to said communications device.

24. The system of claim 22, wherein said messaging engine is further configured to periodically resend said alert message to said communications device.

25. The system of claim 22, wherein said alert message is at least one of a short message service message and a multimedia messaging service message.

26. The system of claim 22, wherein said messaging engine is further configured to:
  receive a second content message from a content provider, said second content message comprising a second content file and second associated metadata;
  determine a second communications device to which to send a second alert message based on said subscription data and said second content message; and
  send said second alert message to said second communications device including said second content file.

* * * * *